United States Patent [19]

Robinson et al.

[11] Patent Number: 5,109,062

[45] Date of Patent: Apr. 28, 1992

[54] STABILIZED MANNICH EMULSIONS

[75] Inventors: Peter M. Robinson, High Point, N.C.; K. T. Chang, Columbus; Nguyen Van-Det, Midland, both of Ga.

[73] Assignee: Exxon Chemical Patents Inc., Linden, N.J.

[21] Appl. No.: 614,728

[22] Filed: Nov. 15, 1990

[51] Int. Cl.$^5$ .............. C08J 3/00; C08K 5/29; C08F 2/32
[52] U.S. Cl. ................. 524/801; 524/195; 524/815; 524/827
[58] Field of Search ............ 524/195, 801, 815, 827

[56] References Cited

U.S. PATENT DOCUMENTS

| | | | |
|---|---|---|---|
| 3,988,277 | 10/1976 | Witschonke et al. | 260/29.6 |
| 4,010,131 | 3/1977 | Phillips et al. | 260/29.4 |
| 4,179,370 | 12/1979 | Hubner et al. | 210/51 |

Primary Examiner—Paul R. Michl
Assistant Examiner—Patrick Niland

[57] ABSTRACT

A Mannich emulsion containing a stabilizing amount of a guanidine salt has been found to exhibit substantially increased long term stability, even at elevated temperature.

16 Claims, No Drawings

STABILIZED MANNICH EMULSIONS

BACKGROUND OF THE INVENTION

Mannich emulsions provide the lowest cost cationic polyacrylamide emulsion polymer suitable for sludge dewatering. The emulsions are prepared from a nonionic polyacrylamide polymer which is made cationic by performing a Mannich reaction on the amide groups along the polyacrylamide backbone. The Mannich reaction comprises reacting the amide groups with both a dialkylamine and a formaldehyde source to form a mixture of tertiary amino structures and water. The tertiary amines may then be quaternized in a conventional manner. The general Mannich reaction may be performed in a number of different ways including (i) adding the formaldehyde and amine separately to the polyacrylamide polymer, (ii) prereacting the amine and formaldehyde to form an adduct which is then added to the polymer and (iii) in a continuous process which involves adding a mixture of the individual reactants at various points along a continuously moving liquid stream. Numerous variations of these processes are disclosed and well known in the art.

The water-in-oil Mannich emulsions produced by these processes which are sold into the municipal market have three significant drawbacks relating to storage and handling. First, the emulsions lose their mechanical strength, i.e. loss of flow properties leading to stringiness and complete gelation of the emulsion. Second, the emulsions lose their chemical stability, i.e. a loss of cationicity, and a reversal of the Mannich reaction leads to the loss of flocculating performance. Third, the polymers crosslink to such an extent that they become water-insoluble.

Various stabilizers have been suggested in the prior art as solutions to overcome the stability problems. For example, U.S. Pat No. 4,179,370 discloses the use of amino salts and amines and U.S. Pat. No. 4,010,131 discloses halogen-free oxygen-containing inorganic acids such as sulfurous acid. None of these stabilizers, however, have been found to sufficiently stabilize the Mannich water-in-oil emulsions of this invention and thus research for improved stabilizers has continued.

The problem of stabilizing Mannich products has also existed with dilute aqueous solutions of acrylamide polymers. For instance, U.S. Pat. No. 3,988,277 discloses the general use of formaldehyde scavengers to provide stabilization to about 4% polyacrylamide polymer aqueous solutions. Specifically, the patent discloses the use of any one of guanidine, hydrazine, ammonia, morpholine, dimethylamine, and urea, with the most effective of these being hydrazine. As shown by comparative example below, when used with the water-in-oil emulsions of this invention as opposed to dilute solutions hydrazine provided no stabilizing effect but rather it de-stabilized the products. Similarly, ammonia in the form of ammonium chloride and urea had little or no effect on the stability.

Accordingly, it is the object of the present invention to improve the chemical stability of water-in-oil emulsions containing Mannich reaction products in high concentrations.

DISCLOSURE OF THE INVENTION

According to the present invention, a Mannich water-in-oil emulsion of improved chemical and physical stability is produced by adding to the water-in-oil emulsion, preferably after the Mannich reaction is performed, one or more guanidine salts. As defined herein, a Mannich emulsion is one formed by reacting the amide groups present on a polymer containing active NH groups and present in the aqueous phase of a water-in-oil emulsion with both an amine and a formaldehyde source. The stabilizing guanidine salt is generally added in an amount of from about 1 to 10 mole % based on the amide functionality of the polymer. The chemical stability of Mannich water-in, oil emulsions can be improved by more than about 100 % by the addition of the stabilizer.

DETAILED DESCRIPTION OF THE PREFERRED EMBODIMENTS

Materials which can be dispersed in a water-in-oil emulsion and which are suitable to be subjected to a Mannich reaction are NH-active compounds, particularly acrylamide and methacrylamide, as homopolymers and copolymers thereof with other conventionally known polymerizable monomers. Especially suitable acrylamide polymers include acrylamide homopolymers such as Callaway 4300; cationic copolymers of acrylamide and dimethylaminoethylmethacrylate methosulfate quaternary such as Callaway 4423; cationic copolymers of acrylamide and dialkyldimethyl ammonium chloride such as Callaway 4110; cationic copolymers of acrylamide and 3-methylacrylamido-propyltrimethylammonium chloride such as Callaway 4909; and anionic copolymers of acrylamide and acrylic acid such as Callaway 4305 and 4310. The molecular weight of the polymers generally exceeds about 1 million.

The oils used in preparing these emulsions may be selected from a large group of organic liquids which include liquid hydrocarbons and substituted liquid hydrocarbons. The water-in-oil emulsions using the known oils and the base polymers are made by techniques well known in the art using conventional emulsifiers and further details are not provided herein.

While any suitable amines may be employed in the Mannich reaction, amines having an active hydrogen and having a general formula of R—$NH_2$ or R—NH—R' wherein R and R' are alkyl or hydroxyalkyl radicals having about 1 to 18 carbon atoms are desirable. Suitable amines include methyl amine, ethylamine, propylamine, butylamine, pentylamine, hexylamine, and the like. Secondary amines such as dimethylamine and diethylamine are particularly preferred. The formaldehyde may be employed in various forms including as an aqueous solution or paraformaldehyde, as well as compounds such as dimethoxymethane and diethoxymethane which will decompose to form formaldehyde.

A water-in-oil emulsion is prepared with the NH-active containing polymers by techniques well known in the art. The emulsions generally contain at least about 20 weight %, preferably about 25 to about 40 weight %, and most preferably about 26 to about 32 weight %, polymer. Thus, the emulsions are substantially more concentrated in comparison with solution polymers. The Mannich reaction is then performed on the polymer by adding an amine and a formaldehyde source to the polymer which is located in the aqueous phase of the water-in-oil emulsion. Generally, the formaldehyde and amine are present in substantially equimolar amount although other ratios may be employed. The Mannich reaction may be carried out in accordance with standard techniques well known in the art. Such techniques include adding each of the amine and the formaldehyde separately to the base polymer, or prereacting the amine and formaldehyde source to form a formaldehyde-amine adduct which is then added to the emulsion, or continuously adding the various reactants at designated points along a continuous liquid stream, or any other such procedure. The amounts and ratios of the reactants that are used will depend upon the particular process that is employed as is well known.

Chemical stability of the resulting Mannich water-in-oil emulsion may be enhanced by the addition of a stabilizing amount of a guanidine salt. Examples of suitable such guanidine salts include the phosphate, hydrochloride, carbonate, nitrite, acetate, sulfate, and sulfite salts. Guanidine nitrate and guanidine carbonate are presently the preferred stabilizers. The stabilizing salts are preferably added to the water-in-oil emulsion containing the amide polymer after the performance of the Mannich reaction. Generally, the stabilizer is first dissolved in a minimum amount of water to obtain a concentrated solution of it which is then added slowly to a well-stirred polymer emulsion with stirring continuing thereafter for a sufficient period of time to assure that good mixing has occurred.

The guanidine salt stabilizers are generally used in an amount of from about 1 to 15 mole % based on the moles of amide groups in the Mannich polymer base, more preferably in an amount of from about 2 to 10 mole %, and most preferably in an amount of from about 3 to 8 mole %. The addition of the stabilizers has been found to increase the shelf life of a room temperature stored Mannich emulsion from about 7 days to more than about 70 days.

While the mechanism of stabilizing action is not completely understood, the guanidine salt stabilizers may act through aldehyde coupling so as to minimize the reversal of the Mannich reaction and thereby preserve polymer cationicity and flocculant performance.

The following Examples illustrate the present invention and its advantages over the prior art. All percents and parts are by weight unless otherwise specified.

Comparative Example A

A polyacrylamide homopolymer was prepared in the aqueous phase of a water-in-oil emulsion. The emulsion contained 26 % polymer, based on the total weight of the emulsion. After the NH groups of the polymer were reacted with dimethylamine and formaldehyde sequentially in a 1.01:1 ratio to form a Mannich polymer emulsion, a conventional breaker surfactant package to form a conventional self-inverting one package emulsion.

Example 1

The procedure of Comparative Example A was repeated except that about 2 hours after completion of the Mannich reaction and before the breaker surfactant was added, a 10% aqueous solution of guanidine nitrate was added to the emulsion to yield a guanidine nitrate content of 4 mole %, i.e. 0.43 weight % based on the weight of the polymer.

The two Mannich compositions of the Comparative Example and this example were then permitted to remain at room temperature (25° C.) for extended periods. Charge densities of the samples and viscosities of diluted samples containing 0.5 weight % polymer were measured at suitable intervals to determine the differences in stability of the two systems. The results, shown in Tables I and II below, demonstrate that the addition of guanidine nitrate substantially increased the stability of the Mannich water-in-oil emulsion.

TABLE I

| Mannich Emulsion | Viscosity (Cp) of 0.5% Polymer Solution | | | | | |
|---|---|---|---|---|---|---|
| | 1 day | 1 wk. | 4 wk. | 7 wk. | 10 wk. | 14 wk. |
| no Guanidine Nitrate | 55 | 57 | 34 | 22 | — | — |
| with Guanidine Nitrate | 50 | — | — | 61 | 64 | 67 |

TABLE II

| Mannich Emulsion | Cationic charge density of aged emulsion (meq/g) | | |
|---|---|---|---|
| | 1 day | 4 wk. | 14 wk. |
| no Guanidine Nitrate | 1.47 | * | |
| with Guanidine Nitrate | 1.41 | — | 1.29 |

*product crosslinked, titration could not be performed.

Instability of the unstabilized polymer is evident from the substantial decrease in viscosity which is indicative of substantial crosslinking and polymer degradation. A decrease in viscosity occurs when a substantial number of the polymer particles have become insoluble at which point the emulsion would no longer be effective for its intended uses.

Comparative Example B

The procedure of Example 1 and the comparative example were repeated except that the guanidine nitrate stabilizer was replaced by methone. The methone was used as a 20 % solution in isopropanol and the emulsion was heated to 50° C. for ½ hour after the addition in an attempt to improve its solubility. Two different methone levels were used, i.e. 0.1 and 0.2 mole % based on the amide groups. The unstabilized emulsion gelled in 5 weeks while the addition of 0.1 mole % methone increased the time to only 6 weeks and the 0.2 mole % methone still gelled in 7 weeks. Methone, although a known aldehyde scavenger, had only a very slight effect on the stability of the Mannich emulsions.

EXAMPLE 2

The procedures of the above example and comparative example were repeated with a guanidine nitrate and guanidine carbonate at various levels. To evaluate the stabilizing effects an accelerated aging test was performed by holding the samples at 40° C. for various times and determining the viscosities of a 0.5% polymer solution to identify when substantial crosslinking and insolubility occur. The results for the stabilized emulsions and an unstabilized one in Table III indicate that guanidine carbonate is equally effective as guanidine nitrate and that increasing the amount of the stabilizer increases the stability of the polymer in the emulsion. The unstabilized emulsion was not usable after 2-3 days at 40° C. while the stabilized emulsions were still effective after 7 days.

TABLE III

| Additive | Viscosity (Cp) of a 0.5% Polymer Solution | | | | | |
|---|---|---|---|---|---|---|
| | 0 hr | 1 day | 2 day | 3 day | 7 day | 8 day |
| None | 55 | 65 | 52 | 26 | | |
| 4 mole % | 52 | 52 | 54 | 58 | 50 | 42 |

TABLE III-continued

| Additive | Viscosity (Cp) of a 0.5% Polymer Solution | | | | | |
|---|---|---|---|---|---|---|
| | 0 hr | 1 day | 2 day | 3 day | 7 day | 8 day |
| Guanidine Nitrate | | | | | | |
| 4 mole % Guanidine Carbonate | 54 | 54 | 58 | 61 | 50 | 41 |
| 8 mole % Guanidine Carbonate | 52 | 52 | 52 | 60 | 56 | 50 |

EXAMPLE 3

The procedure of Example 2 was repeated to compare the effectiveness of guanidine nitrate to both an unstabilized control and an emulsion containing urea which was an effective stabilizer for a Mannich solution. The emulsions were evaluated by holding them at 42° C. As shown in Table IV, urea did not show any stabilizing effect on the emulsion and the guanidine nitrate extended the usable life from 2 days to 7 days.

TABLE IV

| Additive | Viscosity (Cp) of a 0.5% Polymer Solution | | | | | | |
|---|---|---|---|---|---|---|---|
| | 0 hr | 1 day | 2 day | 3 day | 4 day | 6 day | 7 day |
| None | 50 | 54 | 60 | 38 | 25 | | |
| 4 mole % Guanidine Nitrate | 45 | 47 | 51 | 61 | 60 | 48 | 45 |
| 8 mole % Urea | 52 | 53 | 58 | 38 | 18 | | |

COMPARATIVE EXAMPLE C

The procedure of Example 3 was repeated with a variety of reported Mannich stabilizers for solution polymers to determine their effectiveness as stabilizers for Mannich emulsions. An accelerated aging test at 38° C. was used and the results are shown in Table V with the % additive in mole %.

TABLE V

| Additive | Viscosity (Cp) of a 0.5% Polymer Solution | | | | | | |
|---|---|---|---|---|---|---|---|
| | 0 hr | 1 day | 2 day | 3 day | 4 day | 6 day | 7 day |
| NH$_4$Cl - 18% | 55 | 56 | 56 | 54 | 46 | | |
| NH$_2$NH$_2$ - 2% ½ H$_2$SO$_4$ | 55 | 62 | 36 | | | | |
| NH$_2$NH$_2$ - 6% ½ H$_2$SO$_4$ | 55 | 23 | | | | | |
| Guanidine - 3.6% Nitrate | 55 | 55 | 57 | 64 | | 60 | 54 |

The data shows that the control Mannich emulsion had a shelf life of 2 days and 18 mole % ammonium chloride extended the life to 3 days. Hydrazine, reportedly extremely effective with solution Mannich polymers, at 2 mole % reduced the life to 1 day and at higher dosages shortened the life even further. Guanidine nitrate, on the other hand, extended the life of the emulsion to over 7 days.

What is claimed is:

1. A Mannich emulsion formed by reaction of (i) a polymer which is present in the aqueous phase of a water-in-oil emulsion and contains active NH— groups with (ii) both an amine and a source of formaldehyde, said emulsion additionally containing a stabilizing enhancing amount of a guanidine salt.

2. The Mannich emulsion of claim 1, wherein the guanidine salt stabilizer is present in an amount of from about 1 to 15 mole % based on the moles of NH— groups in the polymer.

3. The Mannich emulsion of claim 1, wherein the guanidine salt stabilizer is present in an amount of from about 2 to 10 mole % based on the moles of NH— groups in the polymer.

4. The Mannich emulsion of claim 1, wherein the guanidine salt is selected from the group consisting essentially of nitrate, carbonate, phosphate, citrate, acetate, sulfate and sulfite salts.

5. The Mannich emulsion of claim 1, wherein the guanidine salt is guanidine nitrate.

6. The Mannich emulsion of claim 1, wherein the guanidine salt is guanidine carbonate.

7. The Mannich emulsion of claim 1, wherein the polymer is present in the emulsion in an amount of at least about 20 weight percent, based on the total weight of the emulsion.

8. The Mannich emulsion of claim 1, wherein the polymer is present in the emulsion in an amount of about 25 to about 40 weight percent, based on the total weight of the emulsion.

9. A process for producing the Mannich emulsion of claim 1, comprising forming a water-in-oil emulsion containing in the aqueous phase a polymer having active NH— groups, reacting said NH— groups with an amine and a formaldehyde source to form the Mannich emulsion, and adding a guanidine salt in an amount sufficient to increase the useful life of the Mannich product.

10. The process of claim 9, wherein the guanidine salt stabilizer is present in an amount of from about 1 to 15 mole % based on the moles of NH— groups in the polymer.

11. The process of claim 9, wherein the guanidine salt stabilizer is present in an amount of from about 2 to 10 mole % based on the moles of NH— groups in the polymer.

12. The process of claim 9, wherein the guanidine salt is selected from the group consisting essentially of nitrate, carbonate, phosphate, citrate, acetate, sulfate and sulfite salts.

13. The process of claim 9, wherein the guanidine salt is guanidine nitrate.

14. The process of claim 9, wherein the guanidine salt is guanidine carbonate.

15. The process of claim 9, wherein the polymer is present in the emulsion in an amount of at least about 20 weight percent, based on the total weight of the emulsion.

16. The process of claim 9, wherein the polymer is present in the emulsion in an amount of about 25 to about 40 weight percent, based on the total weight of the emulsion.

* * * * *